(12) United States Patent
Sun (10) Patent No.: US 11,403,603 B2
(45) Date of Patent: Aug. 2, 2022

(54) METHOD AND APPARATUS FOR TRANSFERRING RESOURCE IN BATCHES

(71) Applicant: Alipay Labs (Singapore) Pte. Ltd., Singapore (SG)

(72) Inventor: Jiankang Sun, Zhejiang (CN)

(73) Assignee: Alipay Labs (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/365,411

(22) Filed: Jul. 1, 2021

(65) Prior Publication Data
US 2022/0044214 A1 Feb. 10, 2022

(30) Foreign Application Priority Data

Aug. 6, 2020 (CN) .......................... 202010784659.6

(51) Int. Cl.
*G06Q 20/06* (2012.01)
*G06Q 20/40* (2012.01)
*G06Q 20/38* (2012.01)
*G06Q 20/10* (2012.01)

(52) U.S. Cl.
CPC ....... *G06Q 20/0655* (2013.01); *G06Q 20/102* (2013.01); *G06Q 20/381* (2013.01); *G06Q 20/405* (2013.01)

(58) Field of Classification Search
CPC .. G06Q 20/00; G06Q 20/0655; G06Q 20/102; G06Q 20/381; G06Q 20/405
USPC .......................................................... 705/39
See application file for complete search history.

(56) References Cited

U.S. PATENT DOCUMENTS

2006/0112145 A1* 5/2006 Rieger ..................... G06F 16/93
2017/0091414 A1* 3/2017 Patel ....................... G16H 20/10

FOREIGN PATENT DOCUMENTS

CN 111105219 A * 5/2020

* cited by examiner

*Primary Examiner* — Joseph W. King
*Assistant Examiner* — Liz P Nguyen
(74) *Attorney, Agent, or Firm* — Seed IP Law Group LLP (57) ABSTRACT

Implementations of the present specification provide a method and an apparatus for transferring a resource in batches, applied to the following scenario: a resource transferor holds a first resource, a receiving target of a resource transferee is a second resource, and the first resource of the resource transferor cannot be transferred once in a resource transfer process. In the resource transfer process, a client corresponding to the resource transferor sends a resource transfer request to a conversion serving end. The conversion serving end feeds back a to-be-transferred share and a service identifier to the client. The client transfers a first share of the first resource by using an associated transfer platform based on the to-be-transferred share and the service identifier that are fed back. The associated transfer platform can send a transfer record of the first resource to the conversion serving end based on the service identifier. The conversion serving end dynamically updates the to-be-transferred share until an updated to-be-transferred share does not exceed a predetermined threshold. The conversion serving end can convert the transferred first resource into the second resource based on a predetermined conversion condition. As such, an effective solution of transferring a resource in batches can be provided.

23 Claims, 5 Drawing Sheets

METHOD AND APPARATUS FOR TRANSFERRING RESOURCE IN BATCHES

BACKGROUND

Technical Field

One or more implementations of the present specification relate to the field of computer technologies, and in particular, to a method and an apparatus for transferring online resources in batches.

Description of the Related Art

Resource transfer is a very common phenomenon in people's daily life. The resource herein can be a physical resource, a virtual resource on a network, or an identifier that has the same value as the physical resource on a network platform, such as network data traffic or a data volume contained in a data table.

In the resource transfer process, there are often some resources that need to be transferred in batches. For example, the network data traffic has a daily limit, and this is equivalent to transferring certain network data traffic in batches every day; or the volume of data contained in the data table is too large, and needs to be divided and transferred in packs. In view of this, an effective and feasible resource transfer solution needs to be provided to transfer a resource in batches.

BRIEF SUMMARY

One or more implementations of the present specification describe a method and an apparatus for transferring a resource in batches.

According to a first aspect, a method for transferring a resource in batches is provided, applicable to a resource transfer system, the resource transfer system including a client, a conversion serving end, and an associated transfer platform, the conversion serving end in the resource transfer system converting a first resource of a resource transferor transferred by the client by using the associated transfer platform into a second resource used as a receiving target of a resource transferee, the first resource and the second resource being different forms of resources, and the method being applicable to the conversion serving end, and including: receiving a resource transfer request submitted by the client, the resource transfer request including a resource share described by using the first resource or the second resource; determining a to-be-transferred share of the first resource based on the resource share described by using the first resource or the second resource, and determining a service identifier for the resource transfer request; feeding back the to-be-transferred share and the service identifier to the client, so that the client provides a first share of the first resource for the conversion serving end based on the to-be-transferred share by using the associated transfer platform, and the associated transfer platform sends, to the conversion serving end, a transfer record including the service identifier and the transferred first share; receiving the transfer record, updating the to-be-transferred share based on the service identifier and the first share, and feeding back an updated to-be-transferred share to the client, so that the client sends a new resource transfer request to the associated transfer platform until the updated to-be-transferred share does not exceed a predetermined share; and when detecting that a predetermined conversion condition is met, converting all transferred shares of the first resource into the second resource based on each transfer record corresponding to the service identifier, to complete a resource transfer operation for the resource transfer request.

In some implementations, the to-be-transferred share further corresponds to a transfer time limit, and the transfer time limit can indicate at least one of a start time or an end time at which the client provides the first resource.

In some implementations, the first share is determined by the client by confirming that a current batch of resource transfer ends after at least one round of resource transfer interactive operation between the client and the associated transfer platform.

In some implementations, when the resource transfer request includes the resource share described by using the second resource, the determining the to-be-transferred share of the first resource based on the resource share described by using the first resource or the second resource includes: obtaining a conversion rule between the first resource and the second resource; and determining the to-be-transferred share of the first resource based on the resource share described by using the second resource and the conversion rule.

In some implementations, the receiving the transfer record, and updating the to-be-transferred share based on the service identifier and the first share includes: detecting time-effectiveness of the conversion rule at a current moment; when the time-effectiveness of the conversion rule is not met at the current moment, obtaining a current conversion rule between the first resource and the second resource; determining a total amount of to-be-transferred shares of the first resource again with reference to the current conversion rule; and updating the to-be-transferred share based on a difference between the total to-be-transferred share and the first share.

In some implementations, the predetermined conversion condition is at least one of the following: the updated to-be-transferred share does not exceed the predetermined share; an advance conversion request sent by the client is received; or an in-batch conversion request submitted by the client is received.

According to a second aspect, a method for transferring a resource in batches is provided, applicable to a resource transfer system, the resource transfer system including a client, a conversion serving end, and an associated transfer platform, the conversion serving end in the resource transfer system converting a first resource of a resource transferor transferred by the client by using the associated transfer platform into a second resource used as a receiving target of a resource transferee, the first resource and the second resource being different forms of resources, and the method being applicable to the client, and including: sending a resource transfer request to the conversion serving end, the resource transfer request including a resource share described by using the first resource or the second resource, so that the conversion serving end determines a to-be-transferred share of the first resource based on the resource share described by using the first resource or the second resource, and determines a service identifier for the resource transfer request; receiving the to-be-transferred share of the first resource and the service identifier from the conversion serving end; providing a first share of the first resource for the conversion serving end based on the to-be-transferred share by using the associated transfer platform, so that the associated transfer platform sends, to the conversion serving end, a transfer record including the service identifier and the transferred first share, and the conversion serving end receives the transfer record, updates the to-be-transferred share based on the service identifier and the first share, and feeds back an updated to-be-transferred share to the client when the updated to-be-transferred share exceeds a predetermined share; and when receiving the updated to-be-transferred share fed back by the conversion serving end, continuing providing the first resource for the conversion serving end by using the associated transfer platform.

In some implementations, the to-be-transferred share further corresponds to a transfer time limit, and the transfer time limit can indicate at least one of a start time or an end time at which the client provides the first resource.

In some implementations, the providing the first share of the first resource for the conversion serving end based on the to-be-transferred share by using the associated transfer platform includes: after at least one round of resource transfer interactive operation with the associated transfer platform, confirming that a current batch of resource transfer ends, so that the associated transfer platform determines the first share transferred in the at least one round of resource transfer interactive operation.

In some implementations, the method further includes: after the providing the first share of the first resource for the conversion serving end based on the to-be-transferred share by using the associated transfer platform, sending an in-batch conversion request for the first share of the first resource to the conversion serving end, so that the serving end converts the first share of the first resource into the second resource based on the in-batch conversion request.

In some implementations, the method further includes: sending an advance conversion request to the conversion serving end, so that the serving end converts, based on the advance conversion request, the first resource in several transfer records corresponding to the service identifier into the second resource.

According to a third aspect, an apparatus for transferring a resource in batches is provided, applicable to a resource transfer system, the conversion serving end in the resource transfer system converting a first resource transferred by the client into a second resource used as a receiving target of a resource transferee, the first resource and the second resource being different forms of resources, and the apparatus being disposed at the conversion serving end, and including: a communication unit, configured to receive a resource transfer request submitted by the client, the resource transfer request including a resource share described by using the first resource or the second resource; a determining unit, configured to determine a to-be-transferred share of the first resource based on the resource share described by using the first resource or the second resource, and determine a service identifier for the resource transfer request; the communication unit being further configured to feed back the to-be-transferred share and the service identifier to the client, so that the client provides a first share of the first resource for the conversion serving end based on the to-be-transferred share by using the associated transfer platform, and the associated transfer platform sends, to the conversion serving end, a transfer record including the service identifier and the transferred first share; an update unit, configured to receive the transfer record, update the to-be-transferred share based on the service identifier and the first share, and feed back an updated to-be-transferred share to the client, so that the client sends a new resource transfer request to the associated transfer platform until the updated to-be-transferred share does not exceed a predetermined share; and a conversion unit, configured to: when detecting that a predetermined conversion condition is met, convert all transferred shares of the first resource into a second share of a target resource based on each transfer record corresponding to the service identifier, to complete a resource transfer operation for the resource transfer request.

According to a fourth aspect, an apparatus for transferring a resource in batches is provided, applicable to a resource transfer system, the resource transfer system including a client, a conversion serving end, and an associated transfer platform, the conversion serving end in the resource transfer system converting a first resource of a resource transferor transferred by the client into a second resource used as a receiving target of a resource transferee, the first resource and the second resource being different forms of resources, and the apparatus being disposed on the client, and including: a communication unit, configured to send a resource transfer request to the conversion serving end, the resource transfer request including a resource share described by using the first resource or the second resource, so that the conversion serving end determines a to-be-transferred share of the first resource based on the resource share described by using the first resource or the second resource, and determines a service identifier for the resource transfer request; and receive the to-be-transferred share of the first resource and the service identifier from the conversion serving end; and a transfer unit, configured to provide a first share of the first resource for the conversion serving end based on the to-be-transferred share by using the associated transfer platform, so that the associated transfer platform sends, to the conversion serving end, a transfer record including the service identifier and the transferred first share, and the conversion serving end receives the transfer record, updates the to-be-transferred share based on the service identifier and the first share, and feeds back an updated to-be-transferred share to the client when the updated to-be-transferred share exceeds a predetermined share; when the communication unit receives the updated to-be-transferred share fed back by the conversion serving end, the transfer unit being further configured to continue providing the first resource for the conversion serving end by using the associated transfer platform.

According to a fifth aspect, a computer readable storage medium is provided, storing a computer program, when the computer program is executed in a computer, the computer being enabled to perform the method according to the first aspect or the second aspect.

According to a sixth aspect, a computing device is provided, including a memory and a processor, the memory storing executable code, and when the processor executes the executable code, the method according to the first aspect or the second aspect being implemented.

The method and the apparatus that are provided in the implementations of the present specification are applicable to the resource transfer system. The resource transfer system herein includes the client, the conversion serving end, and the associated transfer platform. The resource transfer system converts, via the conversion serving end, the first resource transferred by the resource transferor from the associated transfer platform via the client into the second resource used as the receiving target of the resource transferee. This is especially applicable to a scenario in which the resource transferor cannot transfer sufficient amount via a single operation. For example, the amount of single resource transfer is limited, or shares of the held first resource do not belong to the same resource subject.

In the architecture of the method or the apparatus provided in the present specification, the client sends the resource transfer request to the conversion serving end. The conversion serving end feeds back the transferred share of the first resource and the service identifier to the client. The client performs resource transfer by using the associated transfer platform based on the transferred share and the service identifier that are fed back. After completing transfer of the first share of resource, the associated transfer platform sends the transfer record of the resource transfer to the conversion serving end. The conversion serving end dynamically updates the to-be-transferred share, and feeds back the updated to-be-transferred share to the client until the updated to-be-transferred share does not exceed the predetermined threshold. The conversion serving end can convert the first resource in the related transfer record sent by the associated transfer platform into the second resource based on the predetermined conversion condition and the service identifier. This solution can provide an effective resource transfer method when there are limits on the amount of to-be-transferred resource.

BRIEF DESCRIPTION OF THE SEVERAL VIEWS OF THE DRAWINGS

To describe the technical solutions in the implementations of the present technology more clearly, the following is a brief introduction of the accompanying drawings for illustrating such technical solutions. Clearly, the accompanying drawings described below are merely some implementations of the present technology, and a person skilled in the art can derive other drawings from such accompanying drawings without making innovative efforts.

DETAILED DESCRIPTION

The solutions provided in the present specification are described below with reference to the accompanying drawings.

Figure 1:
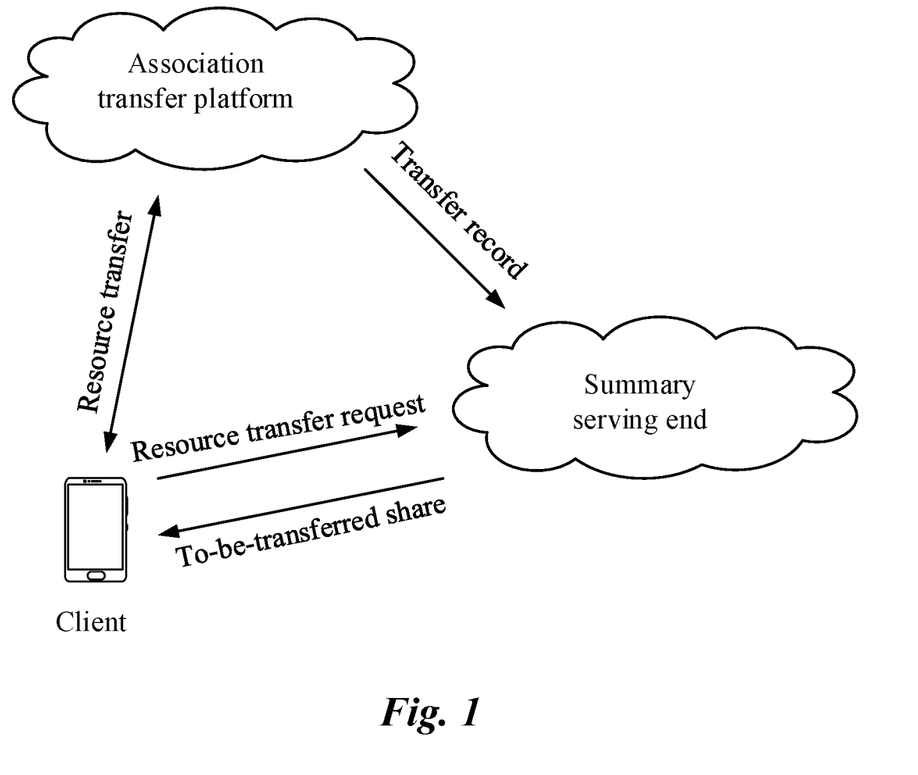
FIG. 1 is a schematic diagram illustrating an example implementation architecture according to the technical concept of the present specification.

First, a description is provided with reference to an example implementation scenario shown in FIG. 1. As shown in FIG. 1, an implementation architecture of the present specification can include a client, a conversion serving end, an associated transfer platform, etc. The conversion serving end can convert a first form of resource (briefly referred to as a first resource below, such as US dollars or bitcoins) into a second form of resource (briefly referred to as second resource below, such as RMB).

An example service scenario can be that a current service party transfers a resource to a peer service party via the client by using the conversion serving end. The current service party (a resource transferor) holds the first resource, and a receiving target of the peer service party (a resource transferee) is the second resource. The associated transfer platform is used by the client to provide resource share(s) for the conversion serving end, and can be a part of the conversion serving end or a third-party transfer platform. No limitation is imposed herein.

A specific resource form can be determined based on a specific service scenario, for example, the resource can be network data traffic, funds, or data. The peer service party herein can be a party relative to the client. For example, when the client is a consumer client, the peer service party can be a service party providing a product or a service, such as a merchant. It can be understood that if the client is a client corresponding to a merchant, the peer service party can alternatively be a consumer.

It is assumed that in the implementation scenario shown in FIG. 1, the client needs to transfer a certain share of target resource, such as document data, funds, or virtual assets, to the peer service party. The first resource provided by the client can also be referred to as a to-be-transferred resource, and the second resource required by the peer service party can also be referred to as a target resource. When the transferred resource and the target resource are both funds, for example, the first resource is RMB, and the second resource is US dollars or bitcoins, in an example service scenario, a transferred share of the first resource and a target share of the second resource can be equivalent or nonequivalent. For example, in addition to the target share of the second resource, the first resource further needs to be used to provide an extra labor service share of the conversion serving end, for example, a commission or a usage fee in a fund transfer process. For another example, in data transfer, in addition to a transmitted valid data share, a share occupied by a file header in a fixed format can be further included.

When providing the to-be-transferred resource, the client can send a resource transfer request to the conversion serving end. The resource transfer request can include resource forms of the first resource and the second resource, and include a resource share described by using the first resource or the second resource. For example, in the resource transfer request, RMB corresponds to the second resource, and US dollars correspond to the first resource. In other words, the first resource transferred by the current service party via the client is in the US dollar form, and the second resource received by the peer service party is in the RMB form. The resource transfer request can further include a resource share described by using US dollars or RMB, for example, a resource share 60,000 yuan described in the RMB form.

The conversion serving end can determine a to-be-transferred share, that needs to be provided by the client, of the first resource based on the resource transfer request. For example, if an exchange rate between US dollar and RMB is 1:6, the to-be-transferred share of the to-be-transferred resource can be 10,000 US dollars. In this case, the target share of the second resource is equivalent to the transferred share of the first resource. When the conversion serving end needs to deduct a 1% commission, the to-be-transferred share can alternatively be 10,100 US dollars. The to-be-transferred share provided by the conversion serving end can include a service identifier corresponding to the resource transfer request. The service identifier can be kept in a resource transfer process to indicate a resource transfer operation for the resource transfer request.

Subsequently, the client can provide the to-be-transferred resource by using the associated transfer platform, and generate a transfer record corresponding to the above service identifier. The associated transfer platform can provide the transfer record for the conversion serving end. The conversion serving end can dynamically adjust the to-be-transferred share based on the transfer record and other related information, and send the adjusted to-be-transferred share to the client. Herein, the transfer record can include a resource share transferred in a current round. The other related information can be determined based on actual situations. For example, in a fund transfer scenario, the other related information can be related information such as an exchange rate or a commission rate. The above process is repeated until a to-be-transferred resource share does not exceed a predetermined threshold, for example, 0. In this case, the conversion serving end can perform conversion based on a correspondence between the target resource and the to-be-transferred resource to complete resource transfer.

In this implementation scenario, for the resource transfer request, the conversion serving end can become associated with the transfer record of the associated transfer platform by using the service identifier, so as to support the resource transfer process in which the client provides the resource shares in batches. In addition, the conversion serving end can dynamically update the to-be-transferred share based on actual situations to improve effectiveness of the resource transfer process.

The technical idea of the present specification is described in detail below.

Figure 2:
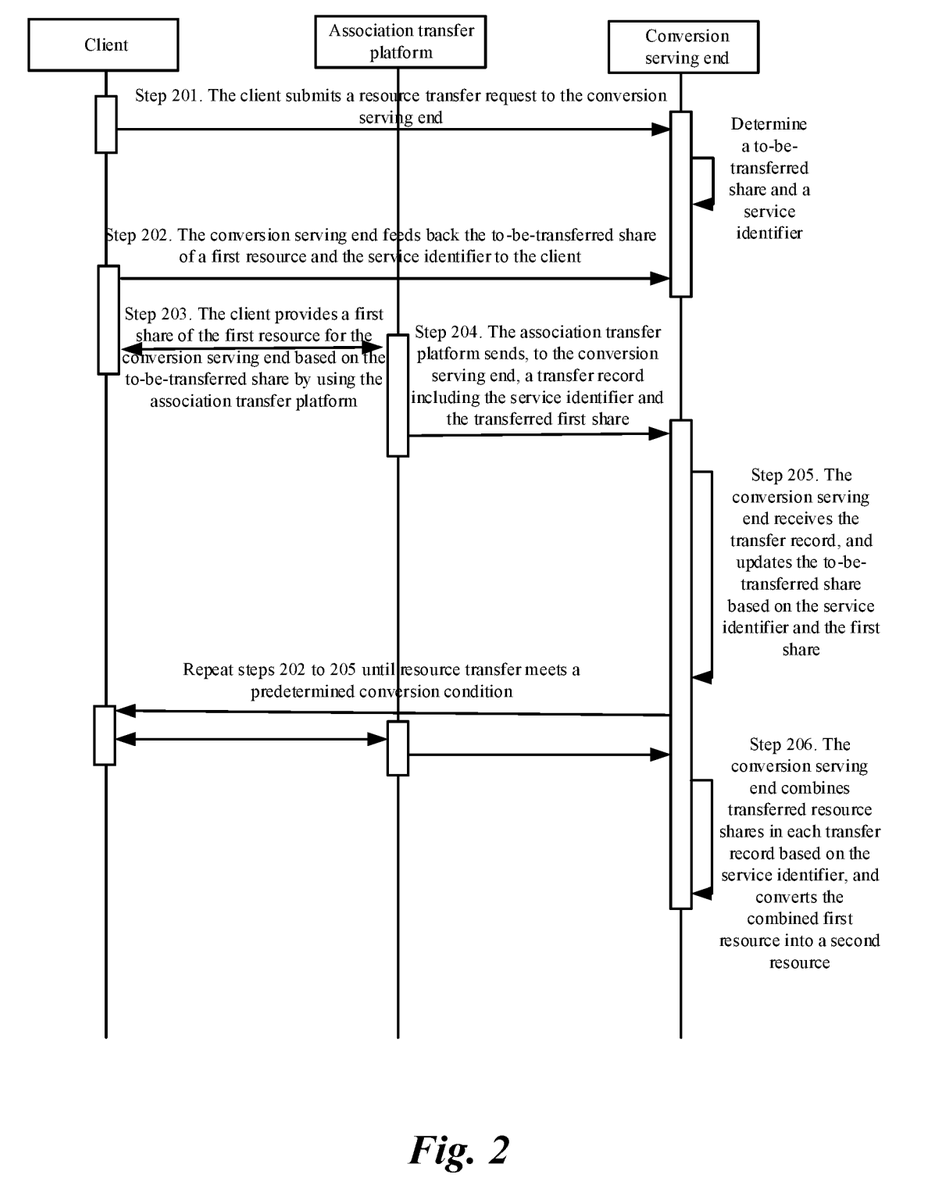
FIG. 2 is a sequence diagram illustrating interaction between parties in resource transfer performed in batches according to some implementations.

FIG. 2 is a sequence diagram illustrating a procedure of transferring a resource in batches according to some implementations of the present specification. In FIG. 2, the procedure of transferring a resource in batches is completed by using a resource transfer system. The resource transfer system can include a client, a conversion serving end, and an associated transfer platform. The resource herein can be any resource that can be randomly divided online and that can be collected by using a computer, for example, transmitted data, network data traffic, or funds. The conversion serving end and the associated transfer platform can be separately implemented by using a computer, a device, or a server having a certain data transmission capability. In an example, the to-be-transferred resource is data, for example, a resource transferor sends data via the client by using a traffic limiting gateway (the associated transfer platform) and a local area network server (the conversion serving end) to another device (the resource transferee). The to-be-transferred resource is funds, for example, a consumer (the resource transferor) pays to a merchant (a resource transferee) via a consumer client of a shopping platform by using a payment platform (the associated transfer platform) and a serving end (the conversion serving end) of the shopping platform, or a user makes cross-border remittance to an overseas user (such as an overseas school, namely, the resource transferee) via a cross-border remittance client by using a payment platform (the associated transfer platform) and a remittance server (the conversion serving end). The associated transfer platform can be a platform associated with the conversion serving end, and can be a part of the conversion serving end, an independent third-party platform, etc. No limitation is imposed herein.

As shown in FIG. 2, first, in step 201, the client submits a resource transfer request to the conversion serving end. The resource transfer request can include a resource share described by using a first resource or a second resource. Herein, the first resource can correspond to a resource form provided by the client for the associated transfer platform, for example, document data. The second resource can correspond to a target resource form of the resource transferee, for example, a compressed data packet.

When the resource transferor has a resource transfer demand, the resource transferor can send a resource transfer request to the conversion serving end via the client. For example, in the above example, the cross-border remittance client submits a cross-border transfer request (the resource transfer request) to the remittance server. In such a scenario, the first resource corresponding to the resource transfer request can be, for example, US dollars; and the second resource can be, for example, RMB. The resource transfer request can include the resource share described by using the first resource, for example, 10,000 US dollars, or the resource share described by using the second resource, for example, 60,000 RMB.

Then, in step 202, the conversion serving end feeds back a to-be-transferred share of the first resource and a service identifier to the client. Herein, the conversion serving end can determine the to-be-transferred share of the first resource based on the resource transfer request, and determine the service identifier for the resource transfer request. The service identifier can be an identifier uniquely identifying the resource transfer request, and can include at least one of a number, a letter, or a symbol. For example, the service identifier can be a serial number determined for a remittance request.

The conversion serving end can determine the to-be-transferred share of the first resource based on the resource share that is described by using the first resource or the second resource and that is included in the resource transfer request. When the resource transfer request includes the resource share of the first resource, the to-be-transferred share of the first resource can be the resource share in the resource transfer request or a resource share determined based on an association factor. For example, an association factor for a to-be-transferred share in the remittance request can be a commission, etc.; and an association factor for a to-be-transferred share in a data transmission request can be a size of content such as a transmission protocol added by data transmission packet(s) based on effective data. When the resource transfer request includes the resource share of the second resource, the association factor of the to-be-transferred share of the first resource can further include a conversion rule between the second resource and the first resource on the basis of the above factors. The conversion rule can be variable or fixed. For example, the conversion rule in cross-border remittance can be an exchange rate between RMB and US dollar, and the exchange rate can be updated every day. In this case, the conversion rule can be time-effective. For example, the exchange rate between US dollar and RMB is valid only for the present day.

In a possible implementation, before step 202, the conversion serving end can further perform validity verification on the resource transfer request. The validity verification herein can be determined based on a specific service scenario. For example, when the first resource is document data, the validity verification can be verification on at least one of a document confidentiality level, one or more of an identity or permission information of a user of the client, etc. When the first resource is funds, the validity verification can be verification on at least one of validity of an identity and an account ID of a user of the client, appearance of a user ID in an anti-money laundering blacklist, an illegal remittance sensitive word included in a submitted remittance purpose remark, etc. The operation in step 202 is performed after the validity verification succeeds.

In some implementations, when the conversion serving end feeds back the to-be-transferred share and the service identifier to the client, there can be corresponding time limit information. The time limit information can indicate at least one of a start time or an end time at which the client provides a transferred resource. For example, the time limit information can indicate that a start time of current remittance is the current time, and an end time of the current remittance is 24 o'clock the next day or another time such as 24 o'clock the present day. In some embodiments, when the time limit information indicates the end time of the current remittance, it can be understood that a time limit requirement of the current remittance is met if any share of resource is transferred before the end time.

In step 203, the client provides a first share of the first resource for the conversion serving end based on the to-be-transferred share by using the associated transfer platform. Usually, as a resource transfer medium, the conversion serving end may not have a transfer function. The client can transfer a resource to the conversion serving end by using a resource transfer medium, namely, the associated transfer platform. Especially, when the to-be-transferred resource is funds, to ensure benefits of both the resource transferor and the resource transferee, transfer of the funds is usually completed by using a third-party platform. For example, when buying a commodity from a merchant on a shopping platform, a user usually transfers funds by using a third-party payment platform (the associated transfer platform), such as a transfer platform provided by UnionPay, WeChat, or Alipay.

When the client transfers funds by using the associated transfer platform, if there is a resource share limit, for example, an insufficient bank card balance or exceeding of a single transaction or daily limit, it is possible that payment (the resource transfer) cannot be completed. In the technical architecture of the present specification, an idea of transferring a resource in batches is provided, so that the client can perform multiple times of resource transfer for one resource transfer request.

In this step, the client can provide the first share of the first resource to the conversion serving end by using the associated transfer platform. Herein, the first share can be less than or equal to the to-be-transferred share. The first share can be determined by the client based on share information of a resource transfer subject. For example, if the resource transfer subject is a bank card, the share information of the resource transfer subject can include a daily limit, a single transaction limit, a current balance, etc. Usually, the first share does not exceed the smallest among the daily limit, the single transaction limit, the current balance, etc. In some embodiments, the client can correspond to multiple resource transfer subjects, and the current resource transfer subject can be any resource transfer subject selected from the multiple resource transfer subjects.

In some designs, when transferring the first share of the first resource in a certain batch by using the associated transfer platform, the client can further perform multiple times of interaction with the associated transfer platform. For example, when the first resource is funds, the client can determine, based on the single transaction limit or the balance of the current resource subject (for example, a bank card), a resource share to be transferred in one batch. When the daily limit is reached, the client determines to end the current batch of resource transfer. The first share can be a total amount of the first resource transferred in the current batch. In some embodiments, the client can further select a time for a next batch of resource transfer, for example, continues to perform resource transfer the next day.

When the conversion serving end further provides the time limit information, the client can further complete resource transfer on the first share within an indicated time limit. For example, if the time limit information indicates the start time of the resource transfer, the client can perform resource transfer on the first share after the start time. If the time limit information indicates the end time of the resource transfer, the client performs resource transfer on the first share before the end time.

It can be understood that when performing a resource transfer operation by using the associated transfer platform, the client can send, to the associated transfer platform, the service identifier obtained from the conversion serving end, to ensure that the resource transfer operation of the client is performed for the resource transfer request.

Then, in step 204, the associated transfer platform sends, to the conversion serving end, a transfer record including the service identifier and the transferred first share. It can be understood that in addition to resource transfer, the associated transfer platform can further record a resource transfer event to generate the transfer record.

The transfer record can include at least the service identifier and the transferred share. In some implementations, the transfer record can further include one or more of the resource transferor, the resource transferee, the resource subject, etc. The service identifier can indicate the targeted resource transfer request. The transferred share is, for example, the above first share. The resource subject is, for example, a bank card used by a user of the client.

After completing the resource transfer operation on the first share, the associated transfer platform can send, to the conversion serving end, the transfer record including the service identifier and the transferred first share. In some implementations, the associated transfer platform is a third-party platform different from the conversion serving end, and the above service identifier can further include identity information of the conversion serving end, for example, a platform domain name, an APP name, or a platform ID of a certain shopping platform, so that the associated transfer platform can send the transfer record to the corresponding conversion serving end based on the identity information.

In step 205, the conversion serving end receives the transfer record, and updates the to-be-transferred share based on the service identifier and the first share. It can be understood that the conversion serving end can determine, based on the service identifier, the resource transfer request targeted by the current transfer record, and can determine the transferred resource share based on the first share, to update the to-be-transferred share for the corresponding resource transfer request.

In some implementations, the conversion serving end can update the to-be-transferred share into a difference between the current to-be-transferred share and the first share.

In some implementations, the conversion rule between the first resource and the second resource dynamically changes. In this case, the conversion serving end can redetermine the to-be-transferred share based on time-effectiveness of the conversion rule and the transferred first share. For example, in a cross-border remittance scenario, step 201 relates to the resource share 60,000 RMB described by using the second resource, the conversion rule "the exchange rate between RMB and US dollar" used in step 202 is 6:1, and the to-be-transferred share determined in step 202 is 10,000 US dollars. The transfer record indicating that the first share of 2,000 US dollars is transferred is generated the next day.

When receiving the transfer record, the conversion serving end can first query time-effectiveness of the conversion rule "the exchange rate between RMB and US dollar." Assuming that the exchange rate between RMB and US dollar is currently updated to 5:1, the conversion serving end can recalculate the to-be-transferred share of the first resource. For example, after the recalculation, the total to-be-transferred share is 12,000 US dollars, and the first share of 2,000 US dollars has currently been transferred. Therefore, the updated to-be-transferred share is still 10,000 US dollars.

In some designs, the resource transferor can further send an advance conversion request or an in-batch conversion request to the conversion serving end via the client, to convert a transferred corresponding share of the first resource into the second resource in advance or in real time. As such, the conversion serving end can further update the to-be-transferred share based on the second resource obtained after conversion. For example, in the above example, if the resource transferor provides 2,000 US dollars for the resource conversion serving end on the present day, the 2,000 US dollars is converted into the second resource 12,000 RMB in real time. When the exchange rate becomes 5:1 the next day, and a remaining share of the second resource is 48,000 RMB, the to-be-transferred share of the first resource (US dollars) can be determined as 9,600 US dollars. That is, the to-be-transferred share updated by the conversion serving end is 9,600 US dollars.

Usually, when the updated to-be-transferred share exceeds a predetermined threshold (for example, 0), the resource transfer is not completed, and steps 202 to 205 are repeated. That is, the conversion serving end feeds back the updated to-be-transferred share to the client, and the client sends a transfer request to the associated transfer platform again.

For the conversion serving end, the above condition for performing the resource conversion operation can be referred to as a predetermined conversion condition. The predetermined conversion condition can be, for example, that the advance conversion request sent by the client is received, the in-batch conversion request sent by the client is received, or the updated to-be-transferred share does not exceed a predetermined amount (for example, 0 yuan or 1 megabyte of data). When detecting that the predetermined conversion condition is met, in step 206, the conversion serving end converts the transferred first resource into the second resource based on each transfer record corresponding to the service identifier, to complete the resource transfer operation for the above resource transfer request.

In some implementations, the transferred resource can be funds, also referred to as virtual currency. The conversion serving end queries and obtains each transfer record corresponding to the above service identifier, and combines transferred resource shares in the transfer record, for example, combines the transferred resource shares into the first resource 12,000 US dollars. Then, the conversion serving end exchanges the first resource 12,000 US dollars for the second resource 60,000 RMB based on the current exchange rate (US dollar:RMB=1:5). After converting the first resource into the second resource, the conversion serving end performs a next part of resource transfer operation based on the resource transferee related to the resource transfer request. For example, the second resource obtained after conversion is transferred to a resource subject, such as a bank card or a financial platform ID, corresponding to the resource transferee.

In another implementation, the transferred resource is document data. For example, the conversion serving end queries and obtains each transfer record corresponding to the above service identifier, and combines document data in the transfer record into one data set. The conversion serving end can further convert the combined first resource into the second resource, for example, a compressed data packet, and send the compressed data packet to an indicated resource transferee based on the resource transfer request.

In another implementation, the transferred resource is different in different service scenarios, and the conversion serving end can further perform various conversion operations. Details are omitted herein for simplicity.

To further clarify the technical solution described in the present specification, as a specific example, in a cross-border payment scenario, when an electronic wallet has a single transaction limit on a single day, the technical solution of the technical concept of the present specification is applied.

In this scenario, first, a cross-border remittance application (the client) can receive remittance information filled in by a user, such as a sender, a recipient, a currency form of the remittance (the first resource, such as US dollars), a currency form of the receiver (the second resource, such as RMB), and a remitted amount (the resource share described by using the first resource) or a received amount (the resource share described by using the second resource). The client sends a remittance request (the resource transfer request) to a remittance serving end (the conversion serving end) based on the information. The remittance serving end determines, based on the remittance request with reference to at least one related factor of a commission or the exchange rate, an amount that the user needs to pay via the client. When the remittance request includes the remitted amount, the remittance serving end can determine, with reference to the commission, the amount (the to-be-transferred share) that needs to be paid via the client. If the commission is 0, the to-be-paid amount is consistent with the remitted amount. When the remittance request includes the received amount, the to-be-paid amount can be determined with reference to the commission and the current exchange rate. In addition, the remittance server can further determine a uniquely corresponding remittance identifier (the service identifier) for the remittance request. The remittance server feeds back the to-be-paid amount and the remittance identifier to the client. It can be understood that exchange rates of different currency forms can be time-effective. For example, the exchange rates are updated every day. Therefore, the to-be-paid amount fed back by the remittance server to the client can also be time-effective. For example, the to-be-paid amount is effective before 12 p.m. the next day. In some embodiments, before generating the remittance identifier, the remittance serving end can first perform validity verification on information such as a remittance account, a target account, and a remittance remark submitted via the client, for example, whether an illegal activity is related, and performs a subsequent operation only when the verification succeeds. Otherwise, the request can be rejected or a risk warning can be given.

The client initiates a payment request to a payment server (the associated transfer platform). The payment request can include the remittance identifier. The remittance identifier can further include an identifier of the remittance serving end, so that the payment server obtains a payee platform through parsing based on the identifier. The payment server interacts with the client to complete a current payment operation by using a remittance amount (the first share) determined by the client. The remittance amount can be determined by a payment subject selected by the user of the client. For example, if the payment subject is an electronic wallet, a balance in the electronic wallet is 10,000 US dollars, a daily limit of the electronic wallet is 5,000 US dollars, and a single transaction limit is 2,000 US dollars, the remittance amount can be an amount not exceeding 2,000 US dollars. In some embodiments, in an incomplete payment situation, the payment server can further interact with the client to determine whether to continue with the payment or to pay later (for example, the next day). If the user of the client chooses to continue with the payment, the user can continue to pay until the daily limit 5,000 US dollars of the electronic wallet, and 5,000 US dollars is used as an amount (the first share) paid for the current payment request. When the user chooses to pay later, the payment server can generate a payment record based on a total amount paid for the current payment request. In an optional example, the user can further send an advance conversion request via the client. The paid first resource is converted into the second resource in advance at any time before the payment is completed. The user can further send an in-batch conversion request to the remittance server via the client. As such, each time one batch of resource transfer is completed, an attempt to convert the transferred resource into the second resource can be made.

After the payment is completed, the payment server can determine the remittance serving end based on the remittance identifier, and send a payment record to the remittance serving end. The payment record can include the remittance identifier, so that the remittance serving end can determine a targeted remittance request based on the payment record. Then, the remittance serving end can update a to-be-paid amount based on a payment amount in the payment record with reference to a current exchange rate, etc. Assuming that subsequent payment fed back by the client is payment on the next day, the remittance serving end can redetermine the to-be-paid amount the next day based on a real-time exchange rate, until the to-be-paid amount is 0 (not exceeding the predetermined share).

The remittance serving end can settle a paid amount based on the remittance identifier, and exchange the paid amount for a target currency form (for example, RMB), thereby completing a cross-border remittance operation.

In the above process, in the relatively complex resource transfer process, the conversion serving end can dynamically update the to-be-transferred share of the to-be-transferred resource by comprehensively considering various factors, and complete the transfer process of the to-be-transferred resource in batches, so as to provide an effective resource transfer method when the transferred resource share is limited.

Figure 3:
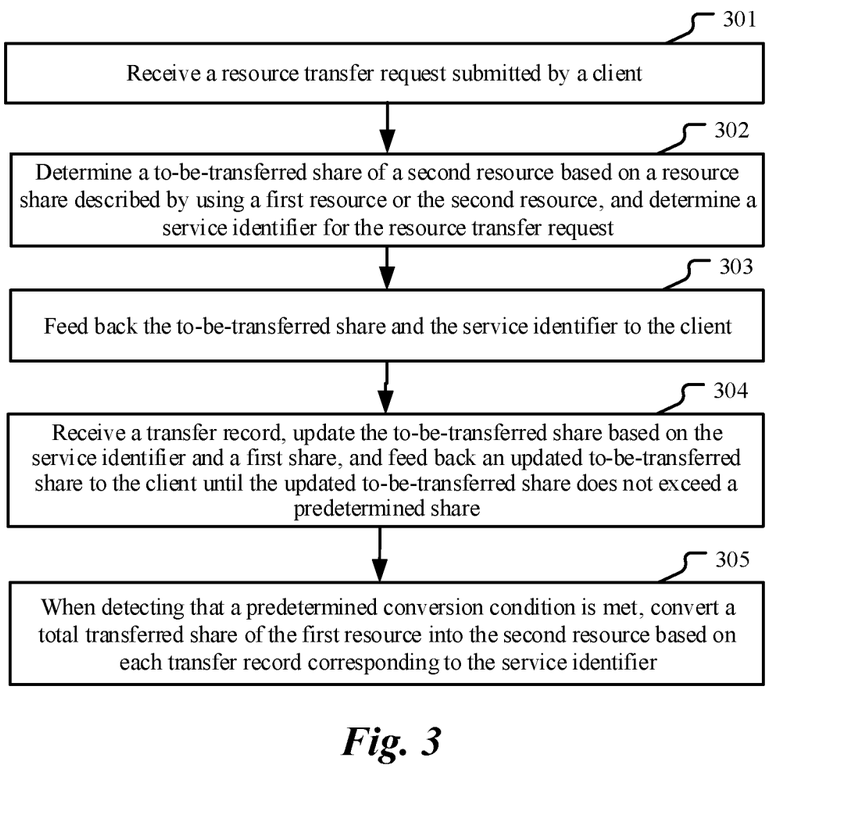
FIG. 3 is a flowchart illustrating a method for transferring a resource in batches of a conversion serving end according to some implementations.

In the sequence diagram shown in FIG. 2, the procedure performed from the perspective of the conversion serving end is shown in FIG. 3.

Step 301. Receive a resource transfer request submitted by a client, the resource transfer request including resource shares described by using a first resource and a second resource.

Step 302. Determine a to-be-transferred share of the second resource based on the resource share described by using the first resource or the second resource, and determine a service identifier for the resource transfer request.

Step 303. Feed back the to-be-transferred share and the service identifier to the client, so that the client provides a first share of the first resource for a conversion serving end based on the to-be-transferred share by using an associated transfer platform, and the associated transfer platform sends, to the conversion serving end, a transfer record including the service identifier and the transferred first share.

Step 304. Receive the transfer record, update the to-be-transferred share based on the service identifier and the first share, and feed back an updated to-be-transferred share to the client, so that the client sends a new resource transfer request to the associated transfer platform until the updated to-be-transferred share does not exceed a predetermined share.

Step 305. When detecting that a predetermined conversion condition is met, convert all transferred shares of the first resource into the second resource based on each transfer record corresponding to the service identifier, to complete a resource transfer operation for the resource transfer request.

Figure 4:
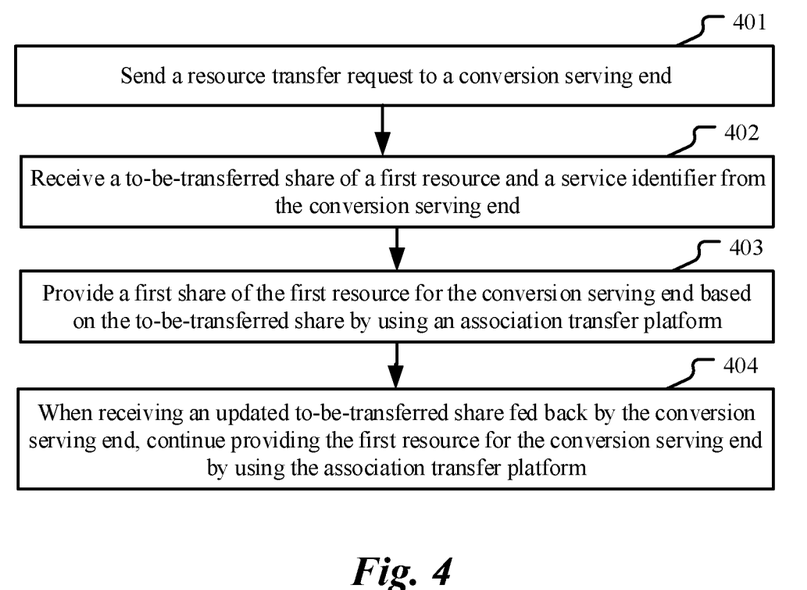
FIG. 4 is a flowchart illustrating a method for transferring a resource in batches of a client according to some implementations.

As shown in FIG. 4, from the perspective of the client, the operations performed in the sequence diagram shown in FIG. 2 include:

Step 401. Send a resource transfer request to the conversion serving end, the resource transfer request including a resource share described by using a first resource or a second resource, so that the conversion serving end determines a to-be-transferred share of the first resource based on the resource share described by using the first resource or the second resource, and determines a service identifier for the resource transfer request.

Step 402. Receive the to-be-transferred share of the first resource and the service identifier from the conversion serving end.

Step 403. Provide a first share of the first resource for the conversion serving end based on the to-be-transferred share by using the associated transfer platform, so that the associated transfer platform sends, to the conversion serving end, a transfer record including the service identifier and the transferred first share, and the conversion serving end receives the transfer record, updates the to-be-transferred share based on the service identifier and the first share, and feeds back an updated to-be-transferred share to the client when the updated to-be-transferred share exceeds a predetermined share.

Step 404. When receiving the updated to-be-transferred share fed back by the conversion serving end, continue providing the first resource for the conversion serving end by using the associated transfer platform.

It should be noted that FIG. 3 and FIG. 4, respectively, describe the method for transferring a resource in batches from the perspectives of the conversion serving end and the client. The related description in the sequence diagram shown in FIG. 2 is also applicable to the procedures in FIG. 3 and FIG. 4. Details are omitted herein for simplicity.

Figure 5:
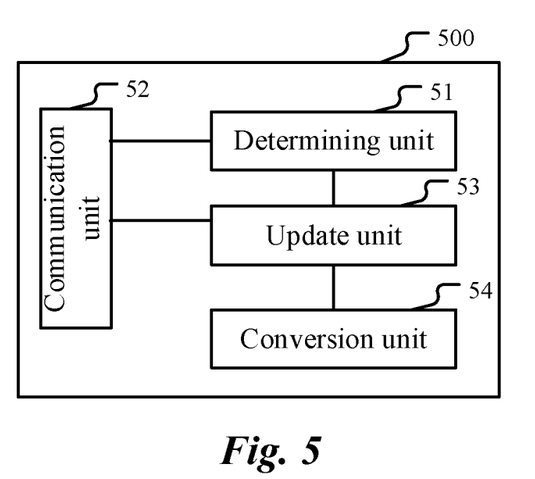
FIG. 5 is a schematic block diagram illustrating an apparatus, disposed at a conversion serving end, for transferring a resource in batches according to some implementations.

According to some implementations of another aspect, an apparatus for transferring a resource in batches is further provided. The apparatus can be disposed at a conversion serving end. As shown in FIG. 5, the apparatus 500 includes: a communication unit 51, configured to receive a resource transfer request submitted by a client, the resource transfer request including a resource share described by using a first resource or a second resource; a determining unit 52, configured to determine a to-be-transferred share of the first resource based on the resource share described by using the first resource or the second resource, and determine a service identifier for the resource transfer request; the communication unit 51 being further configured to feed back the to-be-transferred share and the service identifier to the client, so that the client provides a first share of the first resource for the conversion serving end based on the to-be-transferred share by using an associated transfer platform, and the associated transfer platform sends, to the conversion serving end, a transfer record including the service identifier and the transferred first share; an update unit 53, configured to receive the transfer record, update the to-be-transferred share based on the service identifier and the first share, and feed back an updated to-be-transferred share to the client, so that the client sends a new resource transfer request to the associated transfer platform until the updated to-be-transferred share does not exceed a predetermined share; and a conversion unit 54, configured to: when detecting that a predetermined conversion condition is met, convert all transferred shares of the first resource into a second share of a target resource based on each transfer record corresponding to the service identifier, to complete a resource transfer operation for the resource transfer request.

It should be noted that the apparatus 500 shown in FIG. 5 is an apparatus implementation corresponding to the method implementation shown in FIG. 3, and the related descriptions in the sequence diagram shown in FIG. 2 and the method implementation shown in FIG. 3 are also applicable to the apparatus 500. Details are omitted herein for simplicity.

Figure 6:
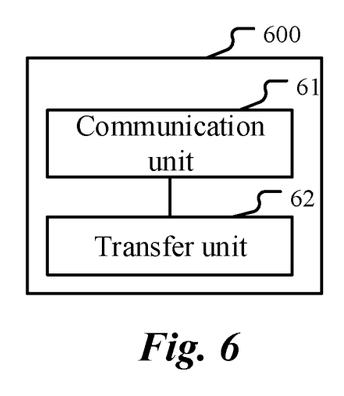
FIG. 6 is a schematic block diagram illustrating an apparatus, disposed on a client, for transferring a resource in batches according to some implementations.

According to some implementations of another aspect, another apparatus for transferring a resource in batches is further provided, and is disposed on a client. As shown in FIG. 6, the apparatus 600, disposed on the client, for transferring a resource in batches can include: a communication unit 61, configured to send a resource transfer request to a conversion serving end, the resource transfer request including a resource share described by using a first resource or a second resource, so that the conversion serving end determines a to-be-transferred share of the first resource based on the resource share described by using the first resource or the second resource, and determines a service identifier for the resource transfer request; and receive the to-be-transferred share of the first resource and the service identifier from the conversion serving end; and a transfer unit 62, configured to provide a first share of the first resource for the conversion serving end based on the to-be-transferred share by using an associated transfer platform, so that the associated transfer platform sends, to the conversion serving end, a transfer record including the service identifier and the transferred first share, and the conversion serving end receives the transfer record, updates the to-be-transferred share based on the service identifier and the first share, and feeds back an updated to-be-transferred share to the client when the updated to-be-transferred share exceeds a predetermined share; when the communication unit 61 receives the updated to-be-transferred share fed back by the conversion serving end, the transfer unit 62 being further configured to continue providing the first resource for the conversion serving end by using the associated transfer platform.

It should be noted that the apparatus 600 shown in FIG. 6 is an apparatus implementation corresponding to the method implementation shown in FIG. 4, and the related descriptions in the sequence diagram shown in FIG. 2 and the method implementation shown in FIG. 4 are also applicable to the apparatus 600. Details are omitted herein for simplicity.

According to some implementations of another aspect, a computer readable storage medium is provided, storing a computer program, when the computer program is executed in a computer, the computer being enabled to perform the method described with reference to FIG. 3 or FIG. 4.

According to some implementations of still another aspect, a computing device is provided, including a memory and a processor, the memory storing executable code, and when the processor executes the executable code, the method described with reference to FIG. 3 or FIG. 4 being implemented.

A person skilled in the art should be aware that in one or more of the above examples, the functions described in the implementations of the present specification can be implemented by using hardware, software, or any combination thereof. When implemented by using software, these functions can be stored in a computer-readable medium or transmitted as one or more instructions or codes on a computer-readable medium.

The above example implementations have further described the purpose, the technical solutions, and the beneficial effects of the technical concept of the present specification. It should be understood that the above is merely example implementations of the technical concept of the present specification, and is not intended to limit the protection scope of the technical concept of the present specification. Any modification, equivalent replacement, improvement, or the like made on the basis of the technical solutions of the implementations of the present specification shall be included in the protection scope of the technical concept of the present specification.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for transferring data in batches for a data transfer system, wherein the data transfer system includes a client device, local area network (LAN) server, and an associated traffic limiting gateway, the LAN server is configured to convert first data of a resource transferor transferred via the client device by using the associated traffic limiting gateway into second data used as a receiving target of a resource transferee, the first data and the second data are different forms of resources, and wherein the method comprises:

receiving, by the LAN server, a resource transfer request from the client device, the resource transfer request including a resource share described by using at least one of the first data or the second data;

determining, by the LAN server, a to-be-transferred share of the first data based on the resource share, and determining a service identifier for the resource transfer request;

feeding back the to-be-transferred share and the service identifier to the client device, for the client device to provide a first share of the first data for the LAN server based on the to-be-transferred share by using the associated traffic limiting gateway, and for the associated traffic limiting gateway to send, to the LAN server, a transfer record including the service identifier and the transferred first share;

receiving, by the LAN server, the transfer record;

updating, by the LAN server, the to-be-transferred share based on the service identifier and the first share;

feeding back an updated to-be-transferred share to the client device, wherein the client device sends one or more new resource transfer requests to the associated traffic limiting gateway until the updated to-be-transferred share does not exceed a share threshold; and in response to detecting a conversion condition being met, converting all transferred shares of the first data into the second data based on each transfer record corresponding to the service identifier, to complete a data transfer operation for the resource transfer request.

2. The method according to claim 1, wherein the to-be-transferred share further corresponds to a transfer time limit that indicates at least one of a start time or an end time for the client device to provide the first data.

3. The method according to claim 1, wherein the first share is determined by the client device by confirming that a current batch of resource transfer ends after at least one round of resource transfer interactive operation between the client device and the associated traffic limiting gateway.

4. The method according to claim 1, wherein in response to determining that the resource transfer request includes the resource share described by using the second data, the determining the to-be-transferred share of the first data includes:

obtaining a conversion rule for conversion between the first data and the second data; and determining the to-be-transferred share of the first data based on the resource share described by using the second resource and the conversion rule.

5. The method according to claim 4, wherein the conversion rule is time-effective; and wherein the receiving the transfer record, and updating the to-be-transferred share based on the service identifier and the first share includes:

detecting time-effectiveness of the conversion rule at a current moment;

in response to the time-effectiveness of the conversion rule not being met at the current moment, obtaining a current conversion rule for conversion between the first data and the second data;

determining an updated total amount of to-be-transferred shares of the first data with reference to the current conversion rule; and updating the to-be-transferred share based on a difference between the updated total amount of to-be-transferred shares and the first share.

6. The method according to claim 1, wherein the conversion condition includes at least one of:

the updated to-be-transferred share does not exceed the share threshold;

an advance conversion request sent by the client device is received; or an in-batch conversion request sent by the client device is received.

7. A method for transferring a data in batches for a data transfer system, wherein the data transfer system includes a client device, a local area network (LAN) server, and an associated traffic limiting gateway, the conversion LAN server in the data transfer system is configured to convert first data of a resource transferor transferred via the client device by using the associated traffic limiting gateway into second data used as a receiving target of a resource transferee, the first data and the second data are different forms of resources, and wherein the method comprises:

sending, by the client device, a resource transfer request to the LAN server, the resource transfer request including a resource share described by using at least one of the first data or the second data, for the LAN server to determine a to-be-transferred share of the first data based on the resource share and to determine a service identifier for the resource transfer request;

receiving, by the client device, the to-be-transferred share of the first data and the service identifier from the LAN server;

providing a first share of the first data for the LAN server based on the to-be-transferred share by using the associated traffic limiting gateway, for the associated traffic limiting gateway to send, to the LAN server, a transfer record including the service identifier and the transferred first share, and for the LAN server to receive the transfer record, update the to-be-transferred share based on the service identifier and the first share, and feed back an updated to-be-transferred share to the client device in response to the updated to-be-transferred share exceeding a share threshold; and in response to receiving the updated to-be-transferred share fed back by the LAN server, continuing to provide the first data for the LAN server by using the associated traffic limiting gateway.

8. The method according to claim 7, wherein the to-be-transferred share further corresponds to a transfer time limit that indicates at least one of a start time or an end time for the client device to provide the first data.

9. The method according to claim 7, wherein the providing the first share of the first data for the LAN server based on the to-be-transferred share by using the associated traffic limiting gateway includes:

after at least one round of resource transfer interactive operation with the associated traffic limiting gateway, confirming that a current batch of resource transfer ends, for the associated traffic limiting gateway to determine the first share transferred in the at least one round of resource transfer interactive operation.

10. The method according to claim 7, further comprising:

after the providing the first share of the first data for the LAN server based on the to-be-transferred share by using the associated traffic limiting gateway, sending an in-batch conversion request for the first share of the first data to the LAN server, for the LAN server to convert the first share of the first data into the second data based on the in-batch conversion request.

11. The method according to claim 7, further comprising:

sending an advance conversion request to the LAN server, for the LAN server to convert, based on the advance conversion request, the first data in several transfer records corresponding to the service identifier into the second data.

12. A non-transitory computer readable medium associated with a data transfer system, wherein the data transfer system includes a client device, a local area network (LAN) server, and an associated traffic limiting gateway, the LAN server is configured to convert first data of a resource transferor transferred via the client device by using the associated traffic limiting gateway into second data used as a receiving target of a resource transferee, the first data and the second data are different forms of resources, and wherein the computer readable medium stores contents that, when executed by one or more processors, cause the one or more processors to perform actions comprising:

receiving, by the LAN server, a resource transfer request from the client device, the resource transfer request including a resource share described by using at least one of the first data or the second data;

determining, by the LAN server, a to-be-transferred share of the first data based on the resource share, and determining a service identifier for the resource transfer request;

feeding back the to-be-transferred share and the service identifier to the client device, for the client device to provide a first share of the first data for the LAN server based on the to-be-transferred share by using the associated traffic limiting gateway, and for the associated traffic limiting gateway to send, to the LAN server, a transfer record including the service identifier and the transferred first share;

receiving, by the LAN server, the transfer record;

updating, by the LAN server, the to-be-transferred share based on the service identifier and the first share;

feeding back an updated to-be-transferred share to the client device, wherein the client device sends one or more new resource transfer requests to the associated traffic limiting gateway until the updated to-be-transferred share does not exceed a share threshold; and in response to detecting a conversion condition being met, converting all transferred shares of the first data into the second data based on each transfer record corresponding to the service identifier, to complete a data transfer operation for the resource transfer request.

13. The computer readable medium according to claim 12, wherein the to-be-transferred share further corresponds to a transfer time limit that indicates at least one of a start time or an end time for the client device to provide the first data.

14. The computer readable medium according to claim 12, wherein the first share is determined by the client device by confirming that a current batch of resource transfer ends after at least one round of resource transfer interactive operation between the client device and the associated traffic limiting gateway.

15. The computer readable medium according to claim 12, wherein in response to determining that the resource transfer request includes the resource share described by using the second data, the determining the to-be-transferred share of the first data includes:

obtaining a conversion rule for conversion between the first data and the second data; and determining the to-be-transferred share of the first data based on the resource share described by using the second data and the conversion rule.

16. The computer readable medium according to claim 15, wherein the conversion rule is time-effective; and wherein the receiving the transfer record, and updating the to-be-transferred share based on the service identifier and the first share includes:

detecting time-effectiveness of the conversion rule at a current moment;

in response to the time-effectiveness of the conversion rule not being met at the current moment, obtaining a current conversion rule for conversion between the first data and the second data;

determining an updated total amount of to-be-transferred shares of the first data with reference to the current conversion rule; and updating the to-be-transferred share based on a difference between the updated total amount of to-be-transferred shares and the first share.

17. The computer readable medium according to claim 12, wherein the conversion condition includes at least one of:

the updated to-be-transferred share does not exceed the share threshold;

an advance conversion request sent by the client device is received; or an in-batch conversion request sent by the client device is received.

18. A device associated with a data transfer system, wherein the data transfer system includes a client device, a network server, and an associated traffic limiting gateway, the network server is configured to convert first data of a resource transferor transferred via the client device by using the associated traffic limiting gateway into second data used as a receiving target of a resource transferee, the first data and the second data are different forms of resources, and wherein the device comprises:

one or more processors; and memory storing contents that, when executed by the one or more processors, cause the device to perform actions comprising:

receiving, by the conversion network server, a resource transfer request from the client device, the resource transfer request including a resource share described by using at least one of the first resource data or the second resource data;

determining, by the conversion network server, a to-be-transferred share of the first resource data based on the resource share, and determining a service identifier for the resource transfer request;

feeding back the to-be-transferred share and the service identifier to the client device, for the client device to provide a first share of the first resource data for the conversion network server based on the to-be-transferred share by using the associated transfer platform traffic limiting gateway, and for the associated transfer platform traffic limiting gateway to send, to the conversion network server, a transfer record including the service identifier and the transferred first share;

receiving, by the network server, the transfer record;

updating, by the network server, the to-be-transferred share based on the service identifier and the first share;

feeding back an updated to-be-transferred share to the client device, wherein the client device sends one or more new resource transfer requests to the associated traffic limiting gateway until the updated to-be-transferred share does not exceed a share threshold; and in response to detecting a conversion condition being met, converting all transferred shares of the first data into the second data based on each transfer record corresponding to the service identifier, to complete a data transfer operation for the resource transfer request.

19. The device according to claim 18, wherein the to-be-transferred share further corresponds to a transfer time limit that indicates at least one of a start time or an end time for the client device to provide the first data.

20. The device according to claim 18, wherein the first share is determined by the client device by confirming that a current batch of resource transfer ends after at least one round of resource transfer interactive operation between the client device and the associated traffic limiting gateway.

21. The device according to claim 18, wherein in response to determining that the resource transfer request includes the resource share described by using the second data, the determining the to-be-transferred share of the first data includes:

obtaining a conversion rule for conversion between the first data and the second data; and     determining the to-be-transferred share of the first resource data based on the resource share described by using the second resource data and the conversion rule.

22. The device according to claim 21, wherein the conversion rule is time-effective; and     wherein the receiving the transfer record, and updating the to-be-transferred share based on the service identifier and the first share includes:

detecting time-effectiveness of the conversion rule at a current moment;

in response to the time-effectiveness of the conversion rule not being met at the current moment, obtaining a current conversion rule for conversion between the first data and the second data;

determining an updated total amount of to-be-transferred shares of the first data with reference to the current conversion rule; and         updating the to-be-transferred share based on a difference between the updated total amount of to-be-transferred shares and the first share.

23. The device according to claim 18, wherein the conversion condition includes at least one of:

the updated to-be-transferred share does not exceed the share threshold;

an advance conversion request sent by the client device is received; or     an in-batch conversion request sent by the client device is received.

* * * * *

UNITED STATES PATENT AND TRADEMARK OFFICE
CERTIFICATE OF CORRECTION

PATENT NO. : 11,403,603 B2
APPLICATION NO. : 17/365411
DATED : August 2, 2022
INVENTOR(S) : Jiankang Sun Page 1 of 2

It is certified that error appears in the above-identified patent and that said Letters Patent is hereby corrected as shown below:

In the Claims

Column 16, Claim 1, Line 47:
"client device, local area network"
Should read:
--client device, a local area network--.

Column 17, Claim 7, Line 61:
"transferring a data"
Should read:
--transferring data--.

Column 17, Claim 7, Line 64:
"the conversion LAN"
Should read:
--the LAN--.

Column 20, Claim 18, Line 26:
"by the conversion network server,"
Should read:
--by the network server,--.

Column 20, Claim 18, Lines 29-30:
"of the first resource data or the second resource data;"
Should read:
--of the first data or the second data;--.

Column 20, Claim 18, Line 31:
"by the conversion network server,"

Signed and Sealed this
Eighth Day of October, 2024

Katherine Kelly Vidal
*Director of the United States Patent and Trademark Office*

CERTIFICATE OF CORRECTION (continued)
U.S. Pat. No. 11,403,603 B2

Should read:
--by the network server,--.

Column 20, Claim 18, Line 32:
"the first resource data based"
Should read:
--the first data based--.

Column 20, Claim 18, Lines 37-38:
"the first resource data for the conversion network server"
Should read:
--the first data for the network server--.

Column 20, Claim 18, Lines 39-40:
"using the associated transfer platform traffic limiting gateway,"
Should read:
--using the associated traffic limiting gateway,--.

Column 20, Claim 18, Lines 41-42:
"to the conversion network server,"
Should read:
--to the network server,--.

Column 21, Claim 21, Line 6-7:
"first resource data based"
Should read:
--first data based--.

Column 21, Claim 21, Line 8:
"the second resource data and"
Should read:
--the second data and--.